Figure 1:
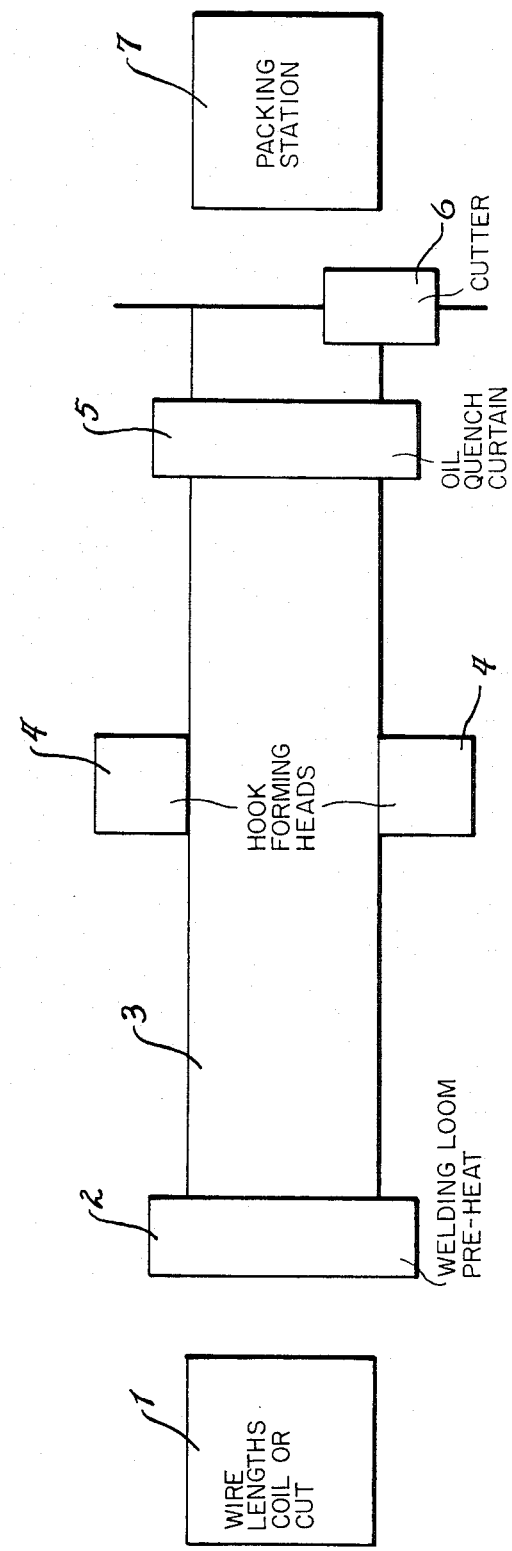

United States Patent [19]

Collier et al.

[11] Patent Number: 4,686,342

[45] Date of Patent: Aug. 11, 1987

[54] PROCESS FOR MAKING WIRE MESH SCREENS

[76] Inventors: John D. Collier, 185 Memorial Drive, Brantford, Ontario, Canada; James W. Scheeler, 5050 Tonawanda Creek Rd., N., Pendleton, N.Y. 14120

[21] Appl. No.: 761,476

[22] Filed: Aug. 1, 1985

[51] Int. Cl.$^4$ .............................................. B23K 11/32
[52] U.S. Cl. ........................................ 219/58; 219/56; 148/127
[58] Field of Search ...................... 219/56, 57, 58, 156; 140/112; 148/127

[56] References Cited

U.S. PATENT DOCUMENTS

| 3,539,752 | 11/1970 | Ernst ........................................ 219/56 |
| 3,648,006 | 3/1972 | Amakasu et al. ...................... 219/58 |
| 3,884,730 | 5/1975 | Hehl ............................. 219/10.57 X |

FOREIGN PATENT DOCUMENTS

| 709370 | 5/1965 | Canada . |
| 830261 | 12/1969 | Canada . |
| 881892 | 9/1971 | Canada . |
| 910163 | 9/1972 | Canada . |
| 8091 | 2/1981 | Japan ................................... 148/127 |
| 763554 | 12/1956 | United Kingdom ............... 148/127 |

OTHER PUBLICATIONS

*Metals Handbook,* 8th ed. vol. 6, Metals Park, Ohio: American Society for Metals, 1971, p. 188.

*Primary Examiner*—E. A. Goldberg
*Assistant Examiner*—C. M. Sigda
*Attorney, Agent, or Firm*—James J. Ralabate

[57] ABSTRACT

A welding process for the manufacture of high carbon steel wire mesh for use in wire screens. In this process at least two high carbon steel wires are crossed and its junction pre-weld heated. The amount of heat applied at this pre-weld step is insufficient to cause wire fusion but sufficient to allow heat to disperse to adjacent areas of each wire. The wires are subsequently welded together and further heated by raising the temperature at the wire junction to a second temperature of at least about 1575° F.

6 Claims, 1 Drawing Figure

PROCESS FOR MAKING WIRE MESH SCREENS

This invention relates to a process for making wire mesh, and, more particularly, to a process for making steel wire products having a high carbon content.

BACKGROUND OF THE INVENTION

It has been known to use wire screens made of mesh products for various purposes. Wire made from high carbon steel has been used as screens in mining, quarry, sand and gravel, steel milling, coal, coking and slag operations and other similar operations such as security barriers in areas requiring a high degree of security. It is important for these uses that the screen be made from high carbon steels because of their high degrees of hardness which gives highest resistance to wear and hence longer working life.

These high carbon steel wire screens have heretofore been manufactured by a process involving weaving pre-crimped wires into a mesh by the use of a loom. This prior art process usually involves laying a longitudinal wire across another to form the desired woven screen or mesh. If larger diameter wires are used, the required processes involve manually placing these wires one across the other. If comparatively small diameter wires are used, they can be woven automatically using relatively expensive machinery. These machines utilize substantially the same technique of weaving as does a textile machine which throws a loaded shuttle from side to side. This method, however, is relatively impractical with large diameter wires and thus limits the widespread use of this weaving method when strong mining and quarry screens are desired. Therefore, to use the prior art automatic weaving methods, one is limited to wires having substantially small diameters. In situations where a high carbon steel screen is desired having larger wire diameters, it is generally required to produce them manually. This can be a time-consuming and relatively expensive manufacturing process. There is, therefore, a major need for an automatic, economical and efficient process for the manufacture of high carbon wire mesh screens having larger wire diameters.

There have been several attempts at commercial manufacture of low carbon content wire mesh using various welding techniques. U.S. Pat. Nos. 3,405,743; 3,539,752; 3,734,383; 4,021,634 and 4,023,600 all relate to methods of producing wire mesh using low carbon wire material. While these patents disclose methods for forming wire mesh screens having increased wire diameters, none of them relates to the use of high carbon steel wire mesh. U.S. Pat. No. 3,539,752 is directed to the fabrication of steel mats. The metal mats and the area near the crossing points of the bars to be welded is subjected to a heating cycle comprised of a first heating period so as to gradually raise the metal to a predetermined temperature above ambient or room temperature, followed by a second cooling period to again gradually reduce the temperature to room temperature according to a continuous time function. The welding of the bars takes place during the brief interval or transition from the heating to the cooling period. The patent states that the heat for preheating the metal can be supplied by any suitable source such as hot air. This patent is not concerned with the use of high carbon steel nor are the problems associated with welding this type material discussed or recognized. In addition, the preheating temperature used in the process of this prior art patent is relatively low.

U.S. Pat. No. 4,021,634 is directed to a mesh welding machine for welding two cross groups of parallel wires. There is not any mention in the patent of welding high carbon wire screens nor of the problems associated therewith.

U.S. Pat. No. 3,405,743 is directed to an apparatus for fabricating a reinforcing mat in which large diameter rods are used.

U.S. Pat. No. 3,734,383 relates to friction welding of longitudinal wires of a mesh. There is not any disclosure in this patent of the use of high carbon steel.

A further welding machine is shown in U.S. Pat. No. 3,731,042 where each welding head in the machine consists of an electrode above the product plane and an electrode below the plane. These are interconnected by a piece which is rigid with the upper electrode and to which the lower electrode is movably mounted. Means are provided to vertically reciprocate below the lower electrode in order that each longitudinal wire is moved upwards against the transverse wire during welding.

U.S. Pat. No. 4,023,600 relates to a method of producing wire mesh using low carbon wire rod material.

Methods for producing steels of high strength and directed to welded wire netting are discussed in Canadian Patent Nos. 709,370; 830,261; 881,892 and 910,163.

U.S. Pat. No. 709,370 discloses a method of producing steels of high strength in which the steel is heated above its transformation temperature then quenched with the corresponding transformation to a metal consisting essentially of martensite. The metal is then tempered up to about 400° F. and it is subjected to a stress having a value between the yield strength of the unstressed metal and the value required to effect a permanent strain of about 4% thereon. There is nothing in the patent regarding the process of welding high carbon wire steels.

U.S. Pat. No. 830,261 is directed to a machine for manufacturing welded wire netting and is particularly concerned with the rollers on the machine for making the wire mesh. Again, there is no disclosure of welding high carbon steel. Canadian Patent No. 881,892 again deals with a machine for making welded wire mesh and is directed to welding heads which are adjustable in such machines. U.S. Pat. No. 910,163 deals with the making of steel springs and wherein the welding wire is not mentioned.

A major reason why none of the above-discussed prior art deals with welding of high carbon steel is that in prior art attempts the wire has become weak and brittle in the vicinity of the weld. Thus, the processes involved with welding of wire have been limited to wires containing low carbon steel.

Welding operations usually necessitate the local application of heat, the amount of heat applied and the temperature locally attained depending upon the type of weld to be made. Thus, the temperature at the heated area may be only sufficient to render the meeting surfaces of the members semi-plastic as in forge welding or sufficient to melt the meeting surfaces thoroughly as in full fusion welding. Although in welding operations the heat is usually applied only to or adjacent to the surfaces to be united, metal adjacent to and remote from the heated surfaces is also heated by conduction from the directly heated surfaces. Such heating being uneven tends to warp and distort the welded article or, in some cases, cause brittleness.

The problem of shrinking and warping is particularly important in the fabrication of welded structures from large sheets and plates such as those which are now used in the construction of railway box cars, gondola cars and other rolling stock. As the metal sheets and plates used in this particular field are relatively thin, they are peculiarly susceptible to warping during welding as the small mass of metal is not strong enough to be resistant to stresses developed by the expansion and construction incidental to the localized application of heat to the metal plate or metal object.

As the grain size is influenced by the time interval during which the temperature is maintained in or above the critical range, it is desirable to cool the metal rapidly to below the critical range as soon as possible after it has been deposited. In cross wire welding similar to projection welding, a large current is passed through the two surfaces which are to be welded. While the passage of this current having a pulse time of part of a second, particularly at the weld interface, causes sufficient heat for the metal to fuse, severe temperature gradients occur. High carbon steel is generally defined as steel or steel alloys having 0.5% to 1.5% carbon. Steel below this amount usually 0.10% to 0.3% is referred to as low or mild carbon steel. Steel having carbon contents between these two forms is usually referred to with reference to the percent carbon and not as "high" or "low" carbon steel. With the exception of very low carbon steels, the effects of these gradients are deleterious. When it is attempted to weld high carbon steels (0.5 to 1.5%) in prior art processes, the adverse effects get worse as the carbon content in the steel is increased. The formation and dispersion in these prior art processes of various forms of carbon and iron known as pearlite, sorbitic pearlite, bainite, troostite, sorbite, cementite, austenite and martensite are considerable. This is undesirable because while it is desirable to form martensite which is the hardest of these listed constituents, the formation of those other than martensite can drastically reduce the hardness of the steel.

Ideally, the grade of steel used for wire screens is that which has the highest hardness and consequently the lowest wear rate which is deemed to have the longest screen life. This occurs when the carbon content of the steel is at least 0.7%. This hardness is related to iron-carbon constituent martensite which is the hardest of those listed above. The specification of the steel is covered by AISI No. 1070, 1074 and 1078 and the martensite becomes harder still when quenched from an elevated temperature. This quenching should be by oil rather than water as the rate of cooling with water is too severe and will induce cracks. There exists today a need for an automatic, effective and an economical welding process for manufacturing wire mesh screens having wider ranges of diameters and composed of high carbon steel.

SUMMARY OF THE INVENTION

It is therefore an object of this invention to provide a process for the manufacture of high carbon steel wire products and screens devoid of the above-noted disadvantages.

Another object of this invention is to provide an efficient and reliable automatic method for the production of steel wire screens wherein the diameter of the wire is substantially larger than heretofore possible in prior art automatic methods.

Still another object of this invention is to provide a novel method for the production of steel wire products and mesh screens that are stronger and have a substantially longer life than previously attainable using prior art welding methods with low carbon steel.

Yet another object of this invention is to provide a method wherein a novel welding process is used to produce welded high carbon steel wire screens.

Still yet another object of this invention is to provide a novel process for the production of high carbon steel wire screens that is automatic and uses a welding process with steel wires having a higher carbon content and width diameter than heretofore used.

The foregoing objects and others are accomplished by this invention generally speaking by providing a novel process for producing high carbon steel wire products including wire screens. In this process, steel wires having a carbon content of at least 0.5% are welded into a screen by first heating the weld joint with a pulse of current insufficient to weld. This heat elevates the temperature in the vicinity of the weld and allows the heat to disperse into the adjacent steel. Then a pulse of current sufficient to weld is applied. Subsequently, the heat is raised to an elevated temperature of an upper range of about 1570° F. to 1625° F. This temperature is held for a prolonged period of several minutes depending upon the diameter of the wire treated. For example, wire having the following diameters is heated for the time as indicated in the below table:

TABLE I

| POST HEAT | |
|---|---|
| Wire Diameter Inches | Heating Time In Seconds |
| 0.1–.20 | 210 |
| 0.21–.40 | 228 |
| 0.41–.60 | 252 |
| 0.61–.80 | 276 |
| 0.81–1.0 | 300 |

Obviously, if the wire diameter exceeds 1.0 inches, the heating time can be incrementally increased according to the ratio as indicated in the above table. After this heat period has elapsed, the wire is quenched oil and the resulting structure is a strong, hard high carbon steel wire mesh with welded interfaces. In the present invention, it is desirable to use AISI (American Iron and Steel Institute) 1070, 1074, 1078 in the drawn condition; that is, not oil tempered. As above noted, the weld joint is slowly heated by applying a pulse of current of about 30–50% of weld pulse, which is insufficient to weld, but capable of elevating the temperature in the vicinity of the weld and allowing the heat to disperse into the adjacent steel. Then the full amount of current will be applied causing fusion to occur, that is, weld. At this point, the weld area could be brittle like glass; it is necessary to achieve a "dispersion of the martensite" by holding the steel at an elevated temperature of approximately 1575° F.–1625° F. (upper critical range) for a prolonged period of several minutes (see Table II below) before quenching in oil or other suitable medium. The result should be a fine homogenous martensite structure with well dispersed cementite. It is desirable to have well dispersed cementite because when dispersed, it tends to be modular and not of a lattice structure, which would encourage stress concentrations along the boundary and subsequent cracking.

Also, while the mesh is being held at an elevated temperature for a long time, the hooks are allowed to be formed. These hooks are put into a woven screen by heating the edge of the screen flattening the crimps, re-heating and bending on a 12 foot brake press. A woven screen may weigh 200-600 pounds, so the present method of hooking is labor-intensive.

Also, it is now possible with welded mesh screens to use a detachable hook, using bolts to secure these detachable edge preparation to the welded wire screen, relying on the integrity of the edge wire, which will be secured by multiple welds as described previously. To date, with a woven screen, it has not been possible to secure hooks by bolting because the last wire in the screen was only secured by crimp interlocking with cross wires. When tension was applied to the screen via the hooks, the cross wires would open and permit the edge wire to separate followed by the hook leaving the screen.

Any suitable high carbon steel or steel alloy may be used in the process of this invention. Steels are interstitial alloys of iron and small amounts of carbon and other atoms. High carbon steel is generally defined as steel or steel alloys having 0.5% to 1.5% carbon. Steel below this amount, usually 0.10% to 0.3%, is referred to as low carbon steel. Steel having carbon contents between these two forms is usually referred to with reference to the percent carbon and not as "high" or "low" carbon steel.

Any suitable wire may be used to form the screen of this invention. Typical wire diameters that can be utilized are 0.032" to 1.00". Typically suitable wires are described in detail in Catalog 110, "Wire Cloth and Wire Screens", published by Greening Donald Co., Ltd., and Catalog No. 13, Buffalo Wire Works Co., of 320 Terrace, Buffalo, N.Y. The range of wire diameter utilizable with the process of this invention is significantly greater than heretofore possible.

The initial heating step of this invention uses a temperature of from about 700° F. to 1000° F. and, as above noted, the time of heating depends upon the diameter of the wires used.

TABLE II

| Diameter of Wire | Temp. Used °F. | Time of Heating |
| --- | --- | --- |
| .032–.105 | 700–1000° | 2/60 second |
| .106–.375 | 700–1000° | 2/60 second |
| .376–.625 | 700–1000° | 3/60 second |
| .626–1.00 | 700–1000° | 3/60 second |

The second and post weld heating step involves from about 1575° F. to 1625° F., and the time of heating and temperature is indicated below:

TABLE III

| Diameter of Wire | Temp. Used °F. | Time of Heating |
| --- | --- | --- |
| .032–.105 | 1575°–1625° | 200 seconds |
| .106–.375 | 1575°–1625° | 228 seconds |
| .376–.625 | 1575°–1625° | 252 seconds |
| .626–1.00 | 1575°–1625° | 300 seconds |

The quenching step involves the use of an oil quench or other suitable medium. Suitable available oils as used in this step are mineral oils available from Shell Oil, Texaco and Exxon. The quenching step involves passing a continuous curtain of oil across the full width of the screen.

As noted earlier, in summary, this invention provides a novel welding method for producing steel wire products including wire mesh having a high carbon content. This method comprises arranging wires containing a high carbon steel relative to each other to form a predetermined mesh screen. The wires are caused to intersect each other during the formation of said predetermined mesh. A current or other method is applied to cause heating the area of the junctions of said intersecting wires at a temperature of from about 700° F. to about 1000° F. for a period to permit subsequent welding of said wires. This permits heating said area to a temperature below the fusing point of said wires and also permitting said heat to disperse to wire areas adjacent said area of the junctions. This prepares the high carbon steel for successful welding. A full pulse of weld current is applied and welding occurs. The resulting wire screen is then quenched with oil.

DESCRIPTION OF THE DRAWING AND PREFERRED EMBODIMENTS OF THE INVENTION

The following examples further illustrate the process of this invention with reference to the preferred materials and conditions.

EXAMPLE I

A steel wire composed of AISI 1070 in the drawn condition was used in this example. The wire had a carbon content of 0.7%. The wire had a wire diameter of 0.312 inches. Several strands of the wire were laid perpendicular to each other and in an electrical resistance welding M/C a pulse was applied at their joints causing a heat imparted thereto of 700° F. to 1000° F. This heat was maintained for 3.5 seconds sufficient to allow the heat to disperse into the adjacent steel areas. The current was increased to accomplish the weld. The post weld elevated temperature cycle occurs where temperatures are elevated to 1575° F. to 1625° F. At this point, the weld area could be brittle like glass. When the steel was held at 1575°–1625° F. for 228 seconds, the weld was strong and secure.

The procedure of Example I was repeated with the following variations:

| Examples | II | III | IV | V | VI |
| --- | --- | --- | --- | --- | --- |
| Steel | AISI-1070 | AISI-1070 | AISI-1070 | AISI-1050 | AISI-1090 |
| % Carbon | 0.7 | 0.7 | 0.7 | 0.5 | 0.9 |
| Wire diameter (Inches) | 0.104 | 0.250 | 0.625 | 1.00 | 0.5 |
| Pre-Heat Time | 2 sec. | 2 sec. | 3 sec. | 3 sec. | 3 sec. |
| Pre-Heat Temp. | 1000° F. | 1000° F. | 800° F. | 800° F. | 800° F. |
| Post-Heat Time | 200 sec. | 228 sec. | 252 sec. | 300 sec. | 228 sec. |

The drawing illustrates a schematic of the preferred sequential steps in the process of this invention. The schematic drawing of the welding system and stations of this invention has the following numerical designations:

1. Wire lengths precut or from coil ready for welding.
2. Welding loom with automatic cross wire fee, and pre-heat ability.
3. Induction heat section for holding welded mesh at elevated temperatures.

4. Pneumatic hook forming heads to allow hooks to be formed while wire mesh is undergoing heat soak.
5. Oil quench curtain, comprising a header above the mesh, a reservoir below with cooler and a pump and filter.
6. A traversing elastic wheel to cut the hard wire mesh; this is normal practice for cutting hard wire woven mesh.
7. Packing station which can be separate or integral with the entire system.

At station 1, the high carbon steel wire is provided in the form of a wire coil or is straightened precut in preparation for the subsequent welding operation depending upon the volume desired. At station 2, the wires are automatically crossed into the desired mesh configuration and the preheating step occurs. The spacing of the wires are set and controlled at this station. The welding also occurs at station 2. The wires all across the screen are held in contact with each other for welding by pneumatic action.

The pre-heat pulse is applied after the wires are set but before welding. See above Table II. Then the welding pulse is applied and welding occurs at station 2. At station 3 during this phase, induction heating coils located beneath the newly welded mesh will hold all the mesh at the post heat temperature for the required times. See Table III above. At station 4, pneumatic hook forming heads are located to allow hooks to be formed while the wire mesh is undergoing exposure to elevated temperatures of station 3. In station 5, an oil quench curtain is located which comprises a header above the mesh, and an oil reservoir below with a cooler, pump and filter. However, any other suitable quench system may be used. In station 6, a traversing elastic wheel is located to cut the hard wire mesh into the final product. At station 7, the final product is prepared for packing and shipping.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A welding process for manufacturing high carbon non-woven steel wire screens which comprises providing a planar array of longitudinal wires containing high carbon steel having a carbon content of at least 0.5%, providing a planar array of similar transverse wires extending transversely of said longitudinal wires, the diameters of said wires being greater than about 0.032 inches, heating at least one junction where said longitudinal and said transverse wires cross to a temperature of from about 700° F. to about 1000° F. for a sufficient period of time to allow heat to disperse to adjacent wire areas but insufficient to cause wire fusion, applying a pulse of electrical current to said junction sufficient to cause fusion or welding of said junction and subsequently heating the resulting welded portion to a post weld temperature of from about 1570° F. to about 1625° F., to permit dispersion of martensite in welded mesh and subsequently quenching the resulting non-woven wire screen with oil.

2. The process of claim 1 wherein during said post weld heating step terminal edge portions of said screen are subjected to substantially said second temperature as in said post weld heating step to permit said edge portions to be bent into hooks.

3. The process of claim 1 wherein said post weld temperature is maintained for at least about 3.0 minutes.

4. The process of claim 1 wherein the steel wires have a carbon content of about 0.5% to 1.5%.

5. The process of claim 1 wherein during said post weld heating step terminal edge portions of said screen are subjected to substantially the therein post weld temperature to permit said edge portions to be bent into hooks.

6. A welding process for manufacturing high carbon non-woven steel wire screens of claim 1 which comprises providing a planar array of longitudinal wires containing high carbon steel having a carbon content of from about 0.7% to about 1.5% providing a planar array of similar transverse wires extending transversely of said longitudinal wires, the diameters of said wires being greater than about 0.032 inches, heating at least one junction where said longitudinal and said transverse wires cross to a temperature of from about 700° F. to about 1000° F. for a sufficient period of time to allow heat to disperse to adjacent wire areas but insufficient to cause wire fusion, applying a pulse of electrical current to said junction sufficient to cause fusion or welding of said junction and subsequently heating the resulting welded portion to a post weld temperature of from about 1570° F. to about 1625° F. to permit dispersion of martensite in welded mesh and subsequently quenching the resulting non-woven wire screen with oil.

* * * * *